United States Patent
Yang et al.

(10) Patent No.: US 7,064,921 B1
(45) Date of Patent: Jun. 20, 2006

(54) DISK DRIVE INCLUDING A DISK PLATE WITH A REDUCED THICKNESS INNER EDGE DISPOSED TOWARDS A SPINDLE MOTOR HUB

(75) Inventors: Lin Yang, San Jose, CA (US); Jin Hui Ou-Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 397 days.

(21) Appl. No.: 10/741,280

(22) Filed: Dec. 19, 2003

(51) Int. Cl.
*G11B 17/02* (2006.01)

(52) U.S. Cl. .................................... 360/97.03

(58) Field of Classification Search ............ None
See application file for complete search history.

(56) References Cited

U.S. PATENT DOCUMENTS

| | | | | |
|---|---|---|---|---|
| 5,134,530 A * | 7/1992 | Hall | ........................ | 360/97.03 |
| 6,097,568 A * | 8/2000 | Ekhoff | ..................... | 360/97.02 |
| 6,212,030 B1 | 4/2001 | Koriyama et al. | ....... | 360/98.08 |
| 6,549,365 B1 * | 4/2003 | Severson | ................. | 360/97.02 |
| 6,882,501 B1 * | 4/2005 | Machcha et al. | ........ | 360/97.03 |
| 6,903,899 B1 * | 6/2005 | Sakata et al. | ............ | 360/97.03 |
| 6,937,433 B1 * | 8/2005 | Dahlenburg et al. | ..... | 360/97.03 |
| 6,972,926 B1 * | 12/2005 | Codilian | .................. | 360/97.02 |
| 2002/0015255 A1 * | 2/2002 | Tadepalli et al. | ........ | 360/97.02 |
| 2002/0135933 A1 | 9/2002 | Harrison et al. | ......... | 360/97.02 |
| 2003/0202276 A1 * | 10/2003 | Smith | ...................... | 360/97.02 |
| 2004/0125488 A1 * | 7/2004 | Zhu et al. | ...................... | 360/75 |
| 2005/0286162 A1 | 12/2005 | Sasaki | ..................... | 360/97.01 |
| 2006/0028760 A1 * | 2/2006 | Zuo et al. | ................ | 360/97.02 |
| 2006/0028761 A1 * | 2/2006 | Zuo et al. | ................ | 360/97.02 |

* cited by examiner

*Primary Examiner*—Jefferson Evans
(74) *Attorney, Agent, or Firm*—Stetina Brunda Garred & Brucker; Joshua C. Harrison, Esq.

(57) ABSTRACT

There is provided a disk drive including a disk drive base and a spindle motor hub. The disk drive further includes first and second disks disposed about the spindle motor hub. The disk drive further includes a disk plate coupled to the disk drive base. The disk plate includes a plate body extending between the first and second disks for modifying air flow adjacent the first and second disks. The plate body includes a plate body thickness in a direction parallel to an axis of rotation of the spindle motor hub. The disk plate further includes an inner edge extending from the plate body and disposed towards the hub. The inner edge includes an edge thickness in a direction parallel to the axis of rotation less than the plate body thickness for mitigating against contact between the inner edge and the first and second disks.

2 Claims, 3 Drawing Sheets

DISK DRIVE INCLUDING A DISK PLATE WITH A REDUCED THICKNESS INNER EDGE DISPOSED TOWARDS A SPINDLE MOTOR HUB

BACKGROUND OF THE INVENTION

1. Field of the Invention

The present invention relates generally to disk drives, and in particular to a disk drive including a disk plate with a reduced thickness inner edge disposed towards a spindle motor hub.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider (collectively referred to as "head" or "slider") for reading and writing data from and to the disk.

The spindle motor includes a spindle motor hub that is rotatably coupled to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes an actuator assembly including the sliders and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. At least one head gimbal assembly (HGA) is distally attached to each of the actuator arms. Each head gimbal assembly biases a head towards the disk. In this regard, the actuator assembly is controllably rotated so as to move the heads relative to the disks for reading and writing operations with respect to the tracks contained on the disks.

A topic of concern is the desire to reduce the effects of airflow generated within the disk drive due to rotation of the disks. Of particular concern is the occurrence of turbulent airflow that may tend to excite a resonance response of the actuator assembly. This results in an increase in the percent off-track values of the associated head. Further, such disk rotation induced airflow may result in a force applied to the actuator assembly, i.e., windage. In addition, such disk rotation induced airflow may result in vibration of the disk or disk flutter. In order to address such problems associated with disk rotation induced airflow, one or more disk plates or anti-disks may be interleaved between the disks. These disk plates extend radially immediately along the disk surfaces for altering the disk rotation induced airflow patterns. This has been found to be effective in mitigating the otherwise negative effects of disk rotation induced airflow.

There is a concern with respect to undesirable contact between the disk plates and the disks. This is because of the inherent close proximity between the disk plates and the disks. Such contact may result in mechanical damage to the disks and electro-static discharge events. It is contemplated that the disk plates may be subject to some degree of deflection upon the disk drive experiencing a significant change in acceleration. In particular, a disk plate may include an inner edge disposed adjacent the spindle motor hub. During such a mechanical shock event, this inner edge may deflect vertically towards the adjacent disks. Should the deflection be large enough, contact between the disk plate at this inner edge and the adjacent disks may occur. Accordingly, there is a need in the art for an improved disk drive and disk plate configuration in comparison to the prior art.

SUMMARY OF THE INVENTION

According to an aspect of the present invention, there is provided a disk drive. The disk drive includes a disk drive base. The disk drive further includes a spindle motor hub rotatably coupled to the disk drive base and configured to rotate about an axis of rotation. The disk drive further includes first and second disks disposed about the spindle motor hub. The disk drive further includes a disk plate coupled to the disk drive base. The disk plate includes a plate body extending between the first and second disks for modifying air flow adjacent the first and second disks during operation of the disk drive. The plate body includes a plate body thickness in a direction parallel to the axis of rotation. The disk plate further includes an inner edge extending from the plate body and disposed towards the hub. The inner edge includes an edge thickness in a direction parallel to the axis of rotation less than the plate body thickness for mitigating against contact between the inner edge and the first and second disks.

The disk plate may include an inner section, and the inner section may extend from the plate body towards the hub. The inner section includes the inner edge. The inner section is tapered from the plate body to the inner edge. In another embodiment, the inner section has a substantially uniform thickness of the inner edge thickness. The inner section may be step-shaped in relation to the plate body. The plate body thickness may be substantially uniform between the first and second disks. The disk plate may be a first disk plate, and the disk drive may further include a second disk plate with the first disk is disposed between the first and second disk plates.

BRIEF DESCRIPTION OF THE DRAWINGS

FIG. 4 is an enlarged cross sectional side view of a portion of a disk plate and disk spacer of FIG. 3;

FIG. 5 is an enlarged cross sectional side view of an inner edge of a portion of the disk plate of FIG. 4; and FIG. 6 is view similar to that of FIG. 5, however, of a disk plate according to another embodiment.

DESCRIPTION OF THE PREFERRED EMBODIMENTS

Figure 1:
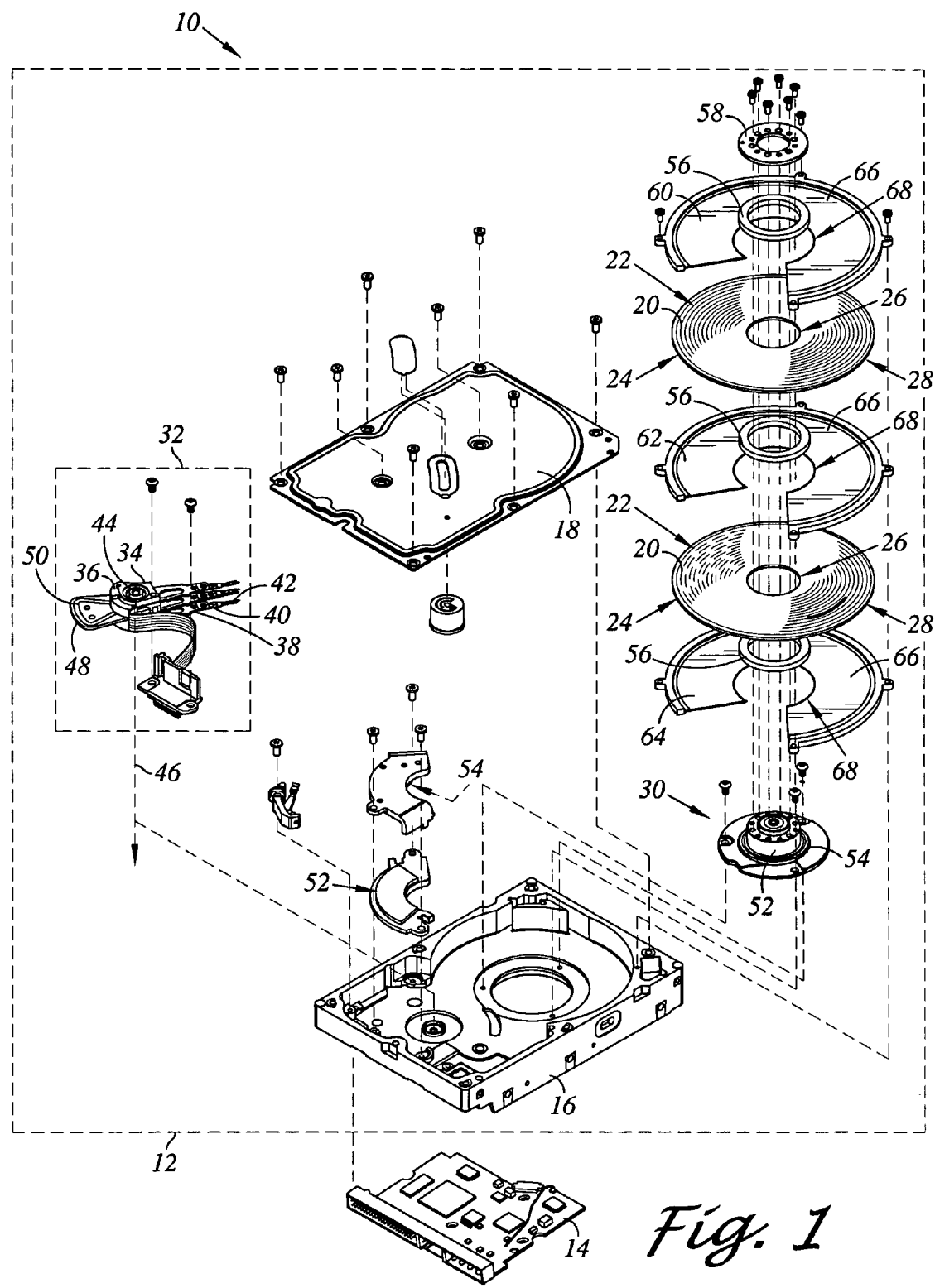
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1–6 illustrate a disk drive including a disk plate in accordance with aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house at least one magnetic disk 20. While two disks 20 are shown, a single disk or multiple disks may be provided. Each disk 20 contains a plurality of tracks for storing data. The tracks are disposed upon opposing first and second disk surfaces 22, 24 of the disk 20 that extend between an inner disk edge 26 (associated with the inner diameter) and an outer disk edge 28 (associated with the outer diameter) of the disk 20. The head disk assembly 12 further includes a spindle motor 30 for rotating the disks 20. The head disk assembly 12 further includes a head stack assembly 32 rotatably attached to the disk drive base 16 in operable communication with the disks 20. The head stack assembly 32 includes a rotary actuator 34.

The actuator 34 includes an actuator body 36 and actuator arms (for ease of illustration, only a lowermost one being denoted 38) that extend from the actuator body 36. Distally attached to the actuator arms (the lowermost one being denoted 38) are head gimbal assemblies (the lowermost one denoted 40). The head gimbal assemblies 40 each includes a slider (the lowermost one denoted 42). Each of the sliders 42 includes a transducer head. The head gimbal assemblies 40 with the sliders 42 not attached are referred to as suspension assemblies. It is contemplated that the number of actuator arms and suspension assemblies may vary depending upon the number of disks and disk surfaces utilized.

The actuator body 36 includes a bore, and the actuator 34 further includes a pivot bearing cartridge 44 engaged within the bore for facilitating the actuator body 36 to rotate between limited positions about an axis of rotation 46. The actuator 34 further includes a coil support 48 that extends from one side of the actuator body 36 opposite the actuator arms 38. The coil support 48 is configured to support an actuator coil 50.

A pair of magnetic elements 52, 54 is supported by mounts which are attached to the disk drive base 16 (magnetic element 54 is indicated by the dashed lead line and it is understood the magnetic element 54 is disposed underneath the upper mount). The coil 50 interacts with the magnetic elements 52, 54 to form a voice coil motor for controllably rotating the actuator 34. The head stack assembly 32 further includes a flex cable assembly 60 and a cable connector 62. The cable connector 62 is attached to the disk drive base 16 and is disposed in electrical communication with the printed circuit board 14. The flex cable assembly 60 supplies current to the actuator coil 52 and carries signals between the transducer heads 42 and the printed circuit board assembly 14.

The spindle motor 30 includes a spindle motor hub 52 that is rotatably coupled to the disk drive base 16. The spindle motor hub 52 has an outer hub flange 54 that supports a lowermost one of the disks 20. Additional disks 20 may be stacked and separated with annular disk spacers 56 that are disposed about the spindle motor hub 52. A disk clamp 58 may be provided to secure the disks 20 and the disk spacers 56 to the spindle motor hub 52. As will be discussed in detail below, the disk drive 10 may include disk plates 60, 62, 64 that are interleaved with the disks 20.

Figure 2:
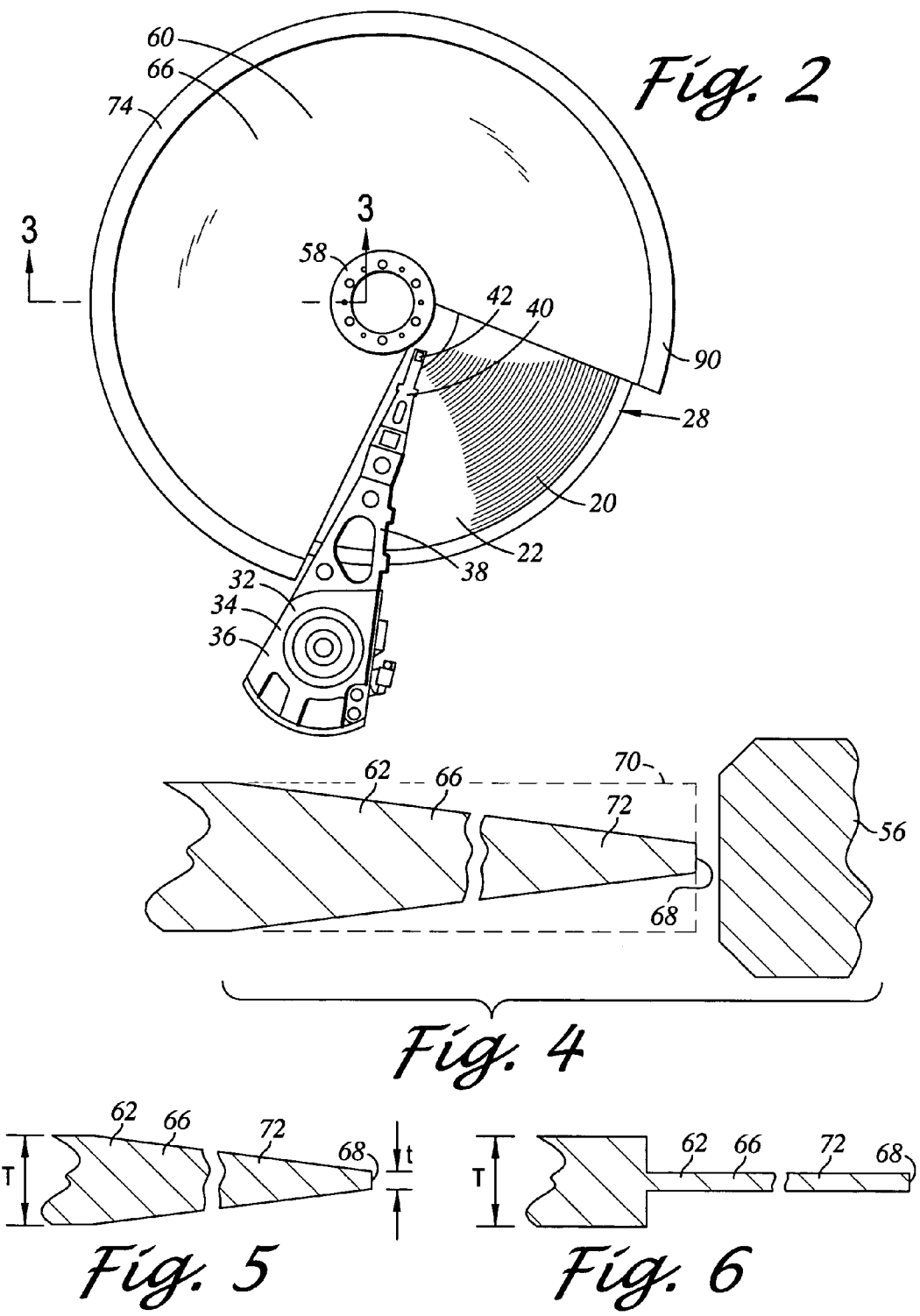
FIG. 2 is an enlarged top plan view of a portion of a head stack assembly, a disk plate and a disk of the disk drive of FIG. 1.

Referring additionally to FIG. 2 there is depicted an enlarged top plan view of a portion of the head stack assembly 32, the disk plate 60 and the disk 20. Further referring to FIG. 3 there is depicted a cross sectional side view of the disk plates 60, 62, 64 and the disks 20 as well as a portions of the spindle motor 30, the disk clamp 58 and the disk spacers 56 as seen along axis 3—3 of FIG. 2.

According to an aspect of the present invention, there is provided the disk drive 10. The disk drive 10 includes the disk drive base 16. The disk drive 10 further includes the spindle motor hub 52 rotatably coupled to the disk drive base 16 and configured to rotate about the axis of rotation 46. The disk drive 10 further includes the disks 20 disposed about the spindle motor hub 52. The disk drive 10 further includes a disk plate, such as disk plate 62, coupled to the disk drive base 16. The disk plate 62 includes a plate body 66 extending between the disks 20 for modifying air flow adjacent the disks 20 during operation of the disk drive 10. The plate body 66 includes a plate body thickness in a direction parallel to the axis of rotation 46. The disk plate 62 further includes an inner edge 68 extending from the plate body 66 and disposed towards the spindle motor hub 52. The inner edge 68 includes an edge thickness in a direction parallel to the axis of rotation 46 less than the plate body thickness for mitigating against contact between the inner edge 68 and the disks 20.

Figure 3:
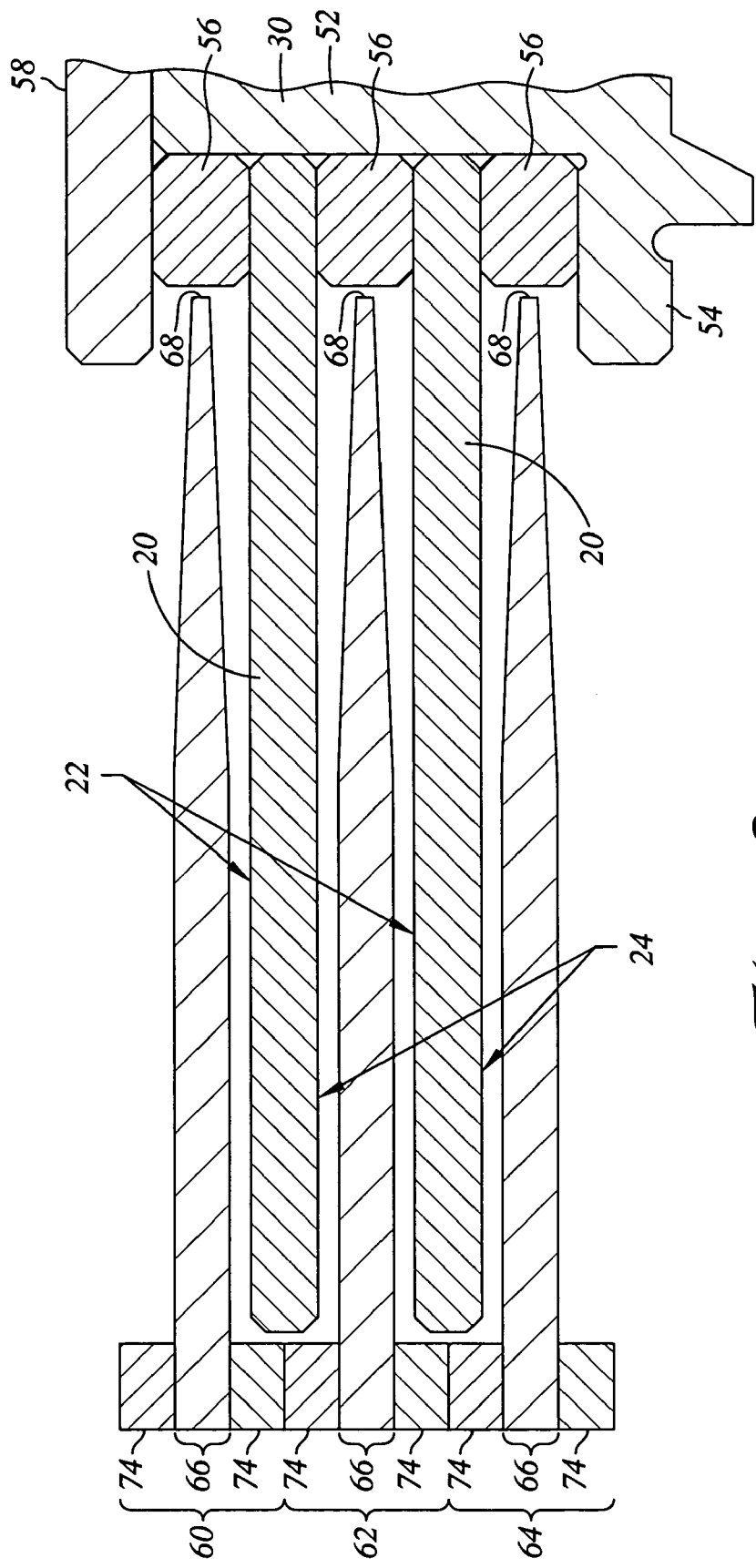
FIG. 3 is a cross sectional side view of the disk plate and the disk as well as a portions of a spindle motor, a disk clamp and disk spacers as seen along axis 3—3 of FIG. 2.

In further detail, FIG. 4 is an enlarged cross sectional side view of a portion of the disk plate 62 and disk spacer 56 of FIG. 3. FIG. 5 is an enlarged cross sectional side view of the inner edge 68 of a portion of the disk plate 62 of FIG. 4. The inner edge 68 includes the edge thickness denoted "t" in a direction parallel to the axis of rotation 46 that is less than the plate body thickness denoted "T" for mitigating against contact between the inner edge 68 and the disks 20. In this regard, in FIG. 4 symbolically depicted in dashed lines is a straight line periphery 70 of the plate body 66 that radially extends to the inner edge 68. Such straight line periphery 70 is exemplary of a comparison disk plate design.

It is understood that upon deflection of the plate body 66 the portion of the plate body 66 that would undergo the greatest amount of vertical deflection (i.e., in a direction parallel to the axis of rotation 46) would occur at the inner edge 68. Such deflection may be a result of the disk drive experiencing a sudden acceleration such as during a substantial mechanical shock event. Should such deflection of the plate body 66 be large enough, contact between the plate body 66 and the adjacent disk 20 would occur adjacent the inner edge 68. The present invention recognizes this and in order to mitigate against such disk contact the inner edge 68 is required to include the edge thickness "t" less than the plate body thickness "T". Thus for example, during such a shock event, the inner edge 68 of the disk plate 62 would tend to deflect vertically as seen in FIG. 3. Should the deflection be large enough, contact between the plate body 66 and the first and second disk surfaces 22, 24 of the adjacent disks 20 may occur. The reduced thickness at the inner edge 68 is contemplated to reduce the sensitivity of the disk drive 10 to such shock events with respect to unwanted contact between the plate body 66 and the disks 20.

As mentioned above, the plate body 66 extends between the disks 20 for modifying air flow adjacent the disks 20 during operation of the disk drive 10. In this regard, a substantial coverage adjacent of the disk surfaces 22, 24 is desirable. In the embodiment shown, the respective plate bodies 66 extend from the outer disk edges 28 of the disks 20 to immediately adjacent the disk spacers 56. It is understood, however, that such coverage is not required, only that the plate body 66 extend radially adjacent some portion of the disks 20. Further, in the embodiment shown as best seen in FIG. 2, the plate body 66 extends in an arced-shape approximately 270 degrees with a "cutout" portion for accommodation of the head stack assembly 32. It is understood, however, that such substantial circumferential coverage of the disks 20 is not required, only that the plate body 66 extend adjacent some portion of the disks 20.

As best seen in FIGS. 3 and 4, the disk plates 60, 62, 64 may each include outer supports 74. The outer supports 74 may be stacked and commonly screw mounted to the disk drive base 16. It is contemplated that other attachment configurations may be implemented as chosen from those which are well known to one of ordinary skill in the art.

As seen in the cross sectional view of FIG. 3, the plate body thickness T may be substantially uniform between the disks 20. Such uniformity is considered in the context of the overall plate body 66. Thus, even a plate body 66 that includes rib structures for mechanical strength characteristics or surface texturing may still be considered uniform. This would be in contrast to a configuration which is stepped or tapered across the plate body 66 for example.

As best shown in FIGS. 4 and 5, the disk plate 66 may include an inner section 72 which extends the plate body 66 towards the spindle motor hub 52. The inner section 72 includes the inner edge 68. The inner section 72 is tapered from the plate body 66 to the inner edge 68. While the inner section 72 is shown to begin approximately halfway along the radial portion of the disks, as seen in FIG. 3, the radial dimensioning of the inner section 72 may be adjusted to any length for the desired taper.

Referring now to FIG. 6, there is depicted a view similar to that of FIG. 5, however, of a disk plate 62 according to another embodiment. In this embodiment, the inner section 72 has a substantially uniform thickness of the inner edge thickness t. As such, the inner section 72 may be step-shaped in relation to the plate body 66.

We claim:

1. A disk drive comprising:
  a disk drive base;
  a spindle motor hub rotatably coupled to the disk drive base and configured to rotate about an axis of rotation;
  first and second disks disposed about the spindle motor hub; and
  a disk plate coupled to the disk drive base, the disk plate including:
  a plate body extending between the first and second disks for modifying air flow adjacent the first and second disks during operation of the disk drive, the plate body including a plate body thickness in a direction parallel to the axis of rotation; and
  an inner edge extending from the plate body and disposed towards the hub, the inner edge including an edge thickness in a direction parallel to the axis of rotation less than the plate body thickness for mitigating against contact between the inner edge and the first and second disks;
  wherein the disk plate includes an inner section, the inner section extends from the plate body towards the hub, the inner section includes the inner edge, and wherein the inner section is step-shaped in relation to the plate body.

2. A disk drive comprising:
  a disk drive base;
  a spindle motor hub rotatably coupled to the disk drive base and configured to rotate about an axis of rotation;
  first and second disks disposed about the spindle motor hub; and
  a disk plate coupled to the disk drive base, the disk plate including:
  a plate body extending between the first and second disks for modifying air flow adjacent the first and second disks during operation of the disk drive, the plate body including a plate body thickness in a direction parallel to the axis of rotation; and
  an inner edge extending from the plate body and disposed towards the hub, the inner edge including an edge thickness in a direction parallel to the axis of rotation less than the plate body thickness for mitigating against contact between the inner edge and the first and second disks;
  wherein the plate body thickness is substantially uniform between the first and second disks.

* * * * *